Figure 1:
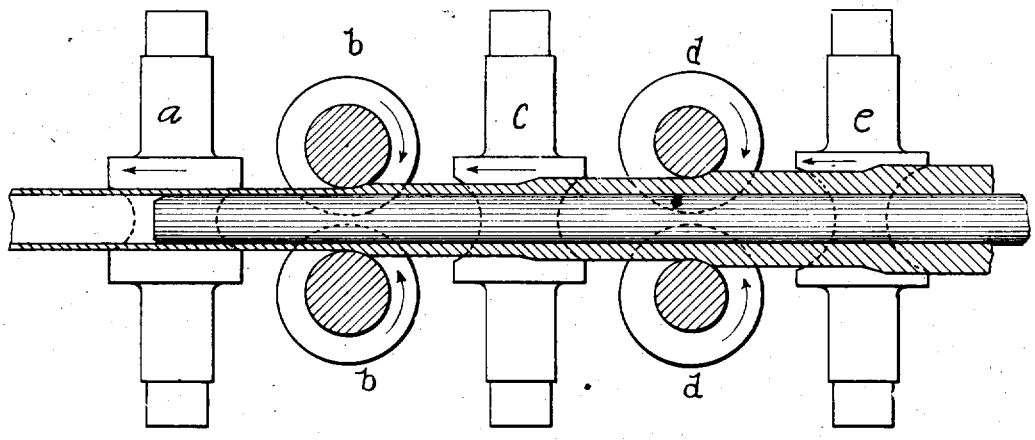

A. FASSL.

METHOD OF ROLLING TUBES.

APPLICATION FILED AUG. 9, 1912.

Reissued Dec. 24, 1912. 13,500.

WITNESSES.

J. R. Keller

John F. Hill

INVENTOR.

Aloys Fassl by Kay + Totten Attys

UNITED STATES PATENT OFFICE.

ALOYS FASSL, OF WESEL, GERMANY, ASSIGNOR TO PITTSBURGH STEEL PRODUCTS COMPANY, OF PITTSBURGH, PENNSYLVANIA, A CORPORATION OF PENNSYLVANIA.

METHOD OF ROLLING TUBES.

13,500. Specification of Reissued Letters Patent. Reissued Dec. 24, 1912.

Original No. 988,634, dated April 4, 1911, Serial No. 284,532. Application for reissue filed August 9, 1912. Serial No. 714,308.

*To all whom it may concern:*

Be it known that I, ALOYS FASSL, a subject of the Emperor of Germany, formerly of Dinslaken, now residing at Wesel, Rhine Province, Germany, have invented a new and useful Improvement in Methods of Rolling Tubes, of which the following is the specification.

In one of the methods of rolling seamless tubes when the so called continuous rolling mills are used, a special grooving is employed in order to move the mandrel which passes freely within the material through the rolling mill at the same speed as the circumferential speed of the last pair of rolls. For this purpose the first pairs of rolls have oblate passes, and the last pair have a circular pass. As the speed of the mandrel and the circumferential speed of the last pair of rolls are equal the mandrel must be equal in length to the rolled out tube. To roll out long tubes, long mandrels must be used which besides being very unwieldy, often cause great difficulties, when pulling the rolled out tube from the mandrel. These disadvantages are avoided by the method hereinafter described, and the pulling off of the rolled out tubing from the mandrels is much facilitated and the cost of the mandrel greatly reduced.

In carrying out my improved method the passes of all the rolls of the mill have preferably an oblate form, the passes of the rolls controlling the speed of the mandrel being less oblate than the passes of the succeeding pairs of rolls. By thus grooving the rolls the mandrel cannot move forward with the circumferential speed of the last or succeeding pairs of rolls, but with little if any more than the circumferential speed of the pair, or pairs of rolls whose passes are least oblate and where the greatest friction between the mandrel and material is produced in rolling. The material being rolled is moved forward on the smooth mandrel by means of the friction in the passes of the last pairs of rolls which are kept rough, and the mandrel moves on at little, if any more than the speed of the preceding rolls with the least oblate pass, or passes, because a greater friction and reduction of the material is produced in the least oblate pass, or passes, than in the last or succeeding pairs of rolls, firstly, on account of the slight oblateness of the pass or passes of the said preceding rolls, and secondly, because of the considerable reduction of material between the mandrel and the last or succeeding pairs of rolls. Therefore the mandrel is checked a little during the rolling and its speed reduced in comparison with the material being rolled, and consequently said mandrel need only be a little longer than the elongation of the piece produced in the rolls having the least oblate pass or passes and which control the speed of the mandrel. Thus if the rolls controlling the speed of the mandrel and having the least oblate pass or passes, have only the half or third of the circumferential speed of the last or succeeding rolls, the mandrel can be correspondingly shorter, only a little being added for the entire rolling out at the end of the rolling process. As the mandrels are liable to wear out and must be continually renewed, short mandrels are a great saving. By the oblate form of the pass between the last pair of rolls the rolled out tubing is also oblate and so can be very easily pulled off over the mandrel, which is not the case with the round pass in the last pair of rolls in the method first above referred to.

Figure 2:
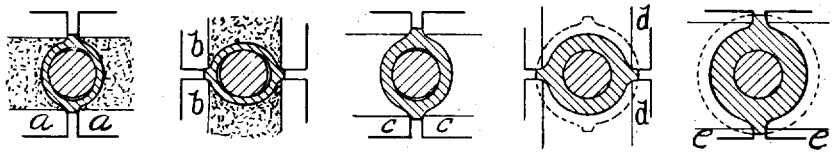

In the accompanying drawing Figure 1 shows a suitable arrangement of rolls for carrying out my improved method, the tube being shown in process of rolling; and Fig. 2 represents the form of the passes of the rolls illustrated in Fig. 1.

I have illustrated a simple form of mill showing an arrangement of rolls for carrying out my improved method, although it is apparent that any other suitable mill or arrangement of rolls may be employed for carrying out said method.

In the drawing the pass of the rolls *e*, which in the mill I have illustrated are the rolls having the least oblate pass, is such that the mandrel is completely surrounded by the material due to the comparatively slight oblateness of said pass, and on the other hand by the considerable reduction of material being rolled, and therefore the friction between the mandrel is much greater than in the succeeding or last pairs of rolls *a*, *b*, which, owing to the oblateness of the passes of said rolls *a*, *b*, loosens the material sidewise from the mandrel, thereby reducing the friction and effecting a more rapid forward movement of the material corresponding to the greater circumferential speed of the rolls *a*, *b*, which are driven at a higher rate of speed, while the mandrel can only follow at the average circumferential speed of the rolls *d*, *e*. In this manner by checking or retarding the movement of the mandrel and causing the tube to travel faster than the mandrel I am able to employ a mandrel considerably shorter than the tube to be rolled and so dispense with the difficulty and expense attending the use of long mandrels.

What I claim is:

A method of rolling tubes in a continuous mill from a longitudinally apertured blank over a mandrel capable of movement in the direction of rolling as the same progresses, which consists in subjecting the blank, when assembled on the mandrel, to a rolling action in said mill, decreasing the frictional contact of the blank with the mandrel in successive passes of the mill and the cross-sectional area of the blank, thereby retarding the movement of the mandrel by the friction of the material surrounding same, and advancing the material on the mandrel at a greater rate of speed than the movement of the mandrel.

ALOYS FASSL. [L. S.]

Witnesses:
HELEN NUFER,
ALBERT NUFER.